United States Patent
Ishikawa et al.

(10) Patent No.: US 6,438,913 B1
(45) Date of Patent: Aug. 27, 2002

(54) GLAZING PANEL WALL SYSTEM

(75) Inventors: Masayoshi Ishikawa, Kurobe (JP); Tsutomu Ito, Marietta, GA (US)

(73) Assignee: YKK Corporation of America, Marietta, GA (US)

( * ) Notice: Subject to any disclaimer, the term of this patent is extended or adjusted under 35 U.S.C. 154(b) by 20 days.

(21) Appl. No.: 09/766,174

(22) Filed: Jan. 19, 2001

(51) Int. Cl.$^7$ ................................................. E04B 2/62

(52) U.S. Cl. ................ 52/235; 52/204.62; 52/235; 52/204.64; 52/204.7; 403/350; 403/351; 403/363; 403/374.1; 403/381; 403/321; 403/326; 403/329

(58) Field of Search .................. 52/204.62, 204.64, 52/204.66, 204.7, 235; 403/350, 351, 363, 374.1, 381, 321, 326, 329

(56) References Cited

U.S. PATENT DOCUMENTS

| | | |
|---|---|---|
| 2,014,419 A | 9/1935 | Voigt |
| 4,672,784 A | 6/1987 | Pohlar |
| 4,750,310 A | 6/1988 | Holcombe |
| 5,481,839 A | 1/1996 | Lang et al. |

Primary Examiner—Carl D. Friedman
Assistant Examiner—Nahid Amiri
(74) Attorney, Agent, or Firm—John A. Galbreath

(57) ABSTRACT

The invention is a glazing panel wall system having unique and advantageous glazing clips. The clips, several different embodiments of which are described, serve to hold the glazing panels and frame member face covers in place. The system comprises the various glazing clips; interconnected frame members, each frame member having recesses adapted for containing glazing panels and a channel adapted for engaging the clips; and face covers which are placed over the front face of the frame members. The invention thus provides a convenient, time-saving, and very effective way of constructing a glazing panel wall.

28 Claims, 13 Drawing Sheets

GLAZING PANEL WALL SYSTEM

CROSS-REFERENCES TO RELATED APPLICATIONS

Not applicable.

BACKGROUND

1. Field of the Invention

The invention is in the area of wall construction systems, specifically a glazing panel wall system which employs unique and advantageous clips to retain the glazing panels and frame member face covers.

2. Description of the Related Art

Panel wall assemblies are known in the art, perhaps the earliest example being U.S. Pat. No. 2,014,419 to Voigt. The assembly of Voigt comprises a metal support framework which uses clips to secure the panels to the framework. Voigt's clip has a projecting button which engages a slot or tongue on the framework; alternatively, Voigt discloses that the button may be located on the framework and the slot or tongue on the clip. U.S. Pat. No. 4,672,784 to Pohlar discloses a wall framing system having a unique internal water deflector which is mounted in a channel of the horizontal mullion of a wall framework.

U.S. Pat. No. 4,750,310 to Holcombe describes a storefront framing system wherein the glazing panels are sandwiched between two opposing framing members. A clip connects the two frame members, by twist-locking into a channel on one frame member and adjustably snapping onto a locking flange on the other frame member. The twist-locking end of the clip has a wedge-shaped aspect which compresses the back of the clip against the back of the channel as the clip is rotated, thereby locking it in place.

U.S. Pat. No. 5,481,839 to Lang et al. discloses a glazed panel wall construction wherein a glazing clip, having face-cover-engaging legs, itself engages a plate-like glazing panel retainer—i.e., the glazing clip provides the means to affix the glazing panel retainer to the frame member channel. This clip and retainer present a major disadvantage, however, in that the glazing retainer depends on the glazing clip in order to function—indeed, the glazing retainer cannot be used independently. Moreover, even in situations where it is desirable to use a glazing retainer having face-cover-engaging properties, the two-piece construction of Lang et al.'s clip/retainer assembly is needlessly costly and requires an extra, unnecessary engagement step. Accordingly, several objects and advantages of the invention are:

The unique "fin" construction used in the base (channel-engaging portion) of each glazing clip allows the clip to be easily rotated within the channel, without jamming, to a position wherein a tight fit against the channel is achieved. The fins provide for even, well-distributed pressure against the channel walls, so the clips can adjust to fit channels of slightly varying widths and can also compensate as the channel shrinks or expands with varying outside temperatures.

Therefore, once the glazing clips are locked into place, they do not move up and down the channel, and thus retain the proper spacing with respect to the glazing panel and the frame. The clips also do not "unrotate" that is, they retain their rotational position—so that the glazing panel stays securely retained by the glazing retainer clip, and the mullion face cover can be installed quickly and easily over the face cover clip.

The glazing retainer clip of the invention does not need to be removed before the mullion face cover can be installed. Rather, it can be simply left in place, and the mullion face cover installed over it. In fact, in the embodiment illustrated in FIG. 5 herein, the glazing retainer clip can even serve to additionally hold the mullion face cover in place.

The glazing retainer clip can be positioned and used separately from the face cover clip—that is, the glazing retainer clip does not depend on the face cover clip in order to function (as it does in U.S. Pat. No. 5,481,839 to Lang et al., for example). The independent functionali the clips lends flexibility to the wall construction process, and facilitates fast and easy installation of the glazing panels and mullion face covers.

Further objects and advantages of the invention will become apparent from a consideration of the drawings and ensuing description.

SUMMARY

The invention is a glazing panel wall system having unique and advantageous glazing clips. The clips, several different embodiments of which are described herein, serve to hold the glazing panels and frame member face covers in place.

DETAILED DESCRIPTION OF THE INVENTION

Figure 1:
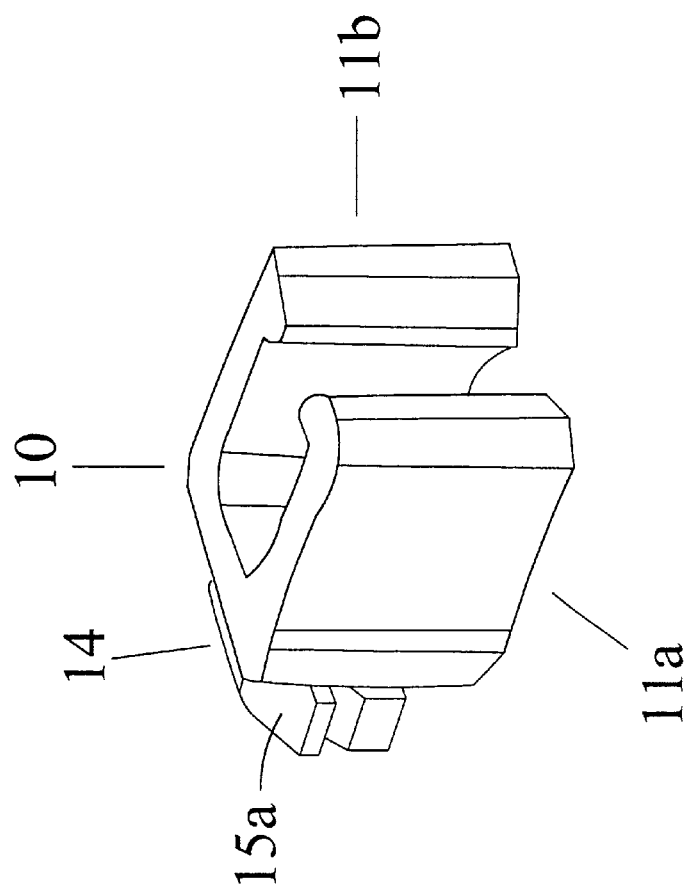
FIG. 1 is a perspective view of the face cover clip, showing the front legs which engage the face cover of the mullion or frame member, and the back base (partially hidden) which engages a channel in the front face of the mullion or frame member.
Figure 11:
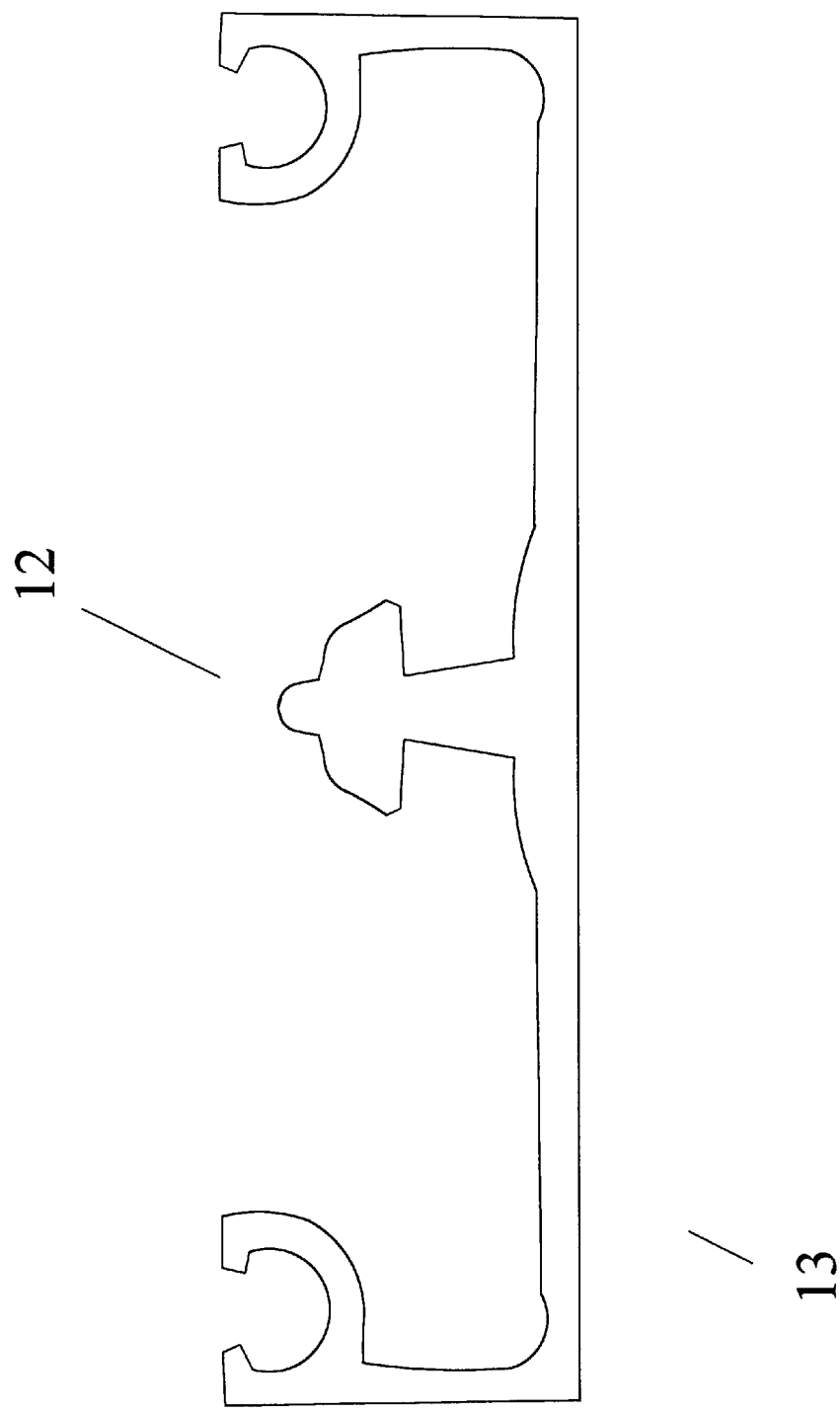
FIG. 11 is an end view of face cover 13, illustrating its structure in detail.
Figure 12:
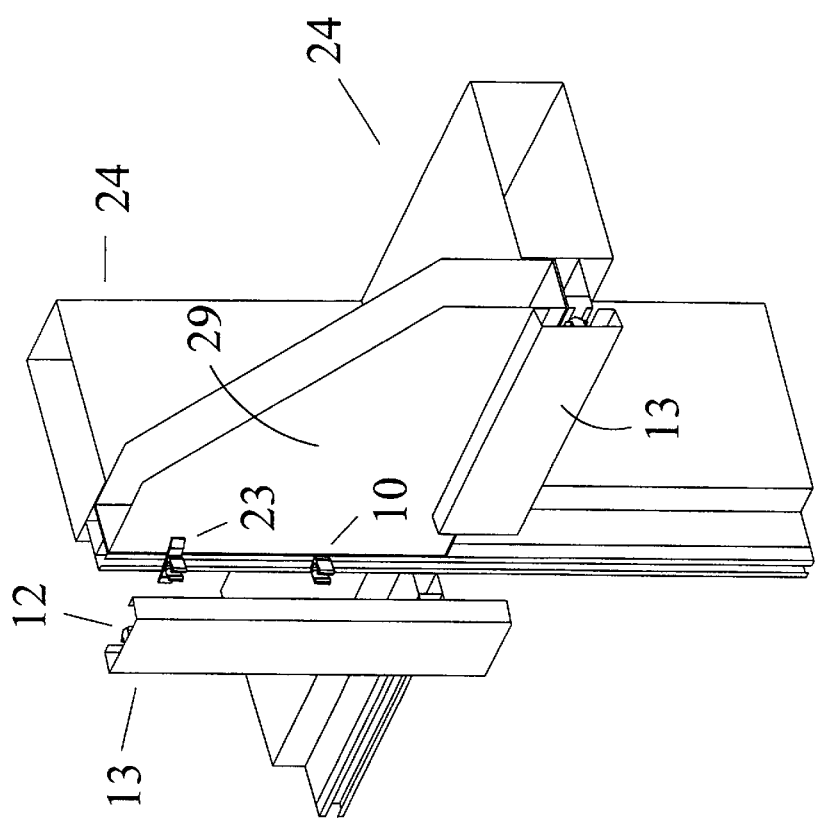
FIG. 12 illustrates the glazing panel wall with one face cover in place over the horizontal frame member, and the other face cover about to be placed over the vertical frame member.

The following provides a list of the reference characters used in the drawings:

10. Face cover clip
11a&b. Legs
12. Rib
13. Face cover
14. Base
15a&b. Fins
16. Boss
17a&b. Entry bevels
18. Glazing retainer clip
19a&b. Retaining arms
20. Turning grip
21a&b. Projections
22. Indent
23. Combination clip
24. Frame member
25. Shelf
26. Channel
27a&b. Flanges
28. Opening
29. Glazing panel FIG. 1 is a perspective view of face cover clip 10 of the invention. The front portion of face cover clip 10 comprises two opposed legs 11a&b, each having a face-cover-engaging end and a non-face-cover-engaging end. Legs 11a&b are joined together at their non-face-cover-engaging ends and are constructed of a resilient material, such that legs 11a&b are able to spring apart to admit a rib 12 on a face cover 13 (rib 12 and face cover 13 are shown in FIGS. 11 & 12), and then spring back to secure face cover 13 in place.

The back portion of face cover clip 10 comprises a base 14 (partially hidden in FIG. 1), said base 14 having a generally rectangular cross section and two fins 15a&b located at diagonally-opposite corners thereof.

Figure 2:
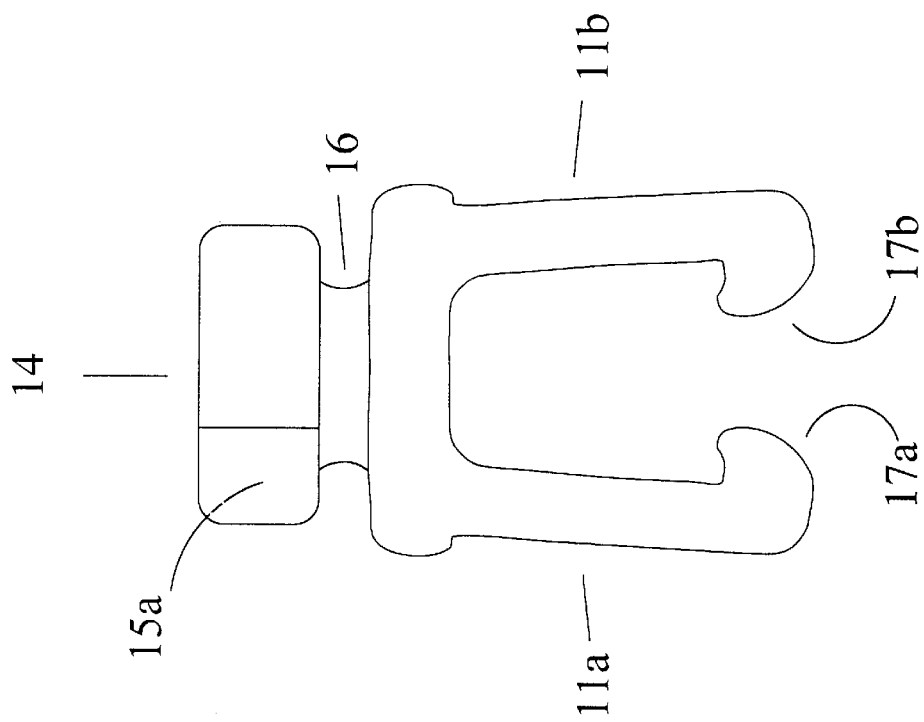
FIG. 2 is a top view of the face cover clip, further illustrating the relationship between the front, face-cover-engaging portion of the clip and the channel-engaging base portion of the clip.

FIG. 2 is a top view of face cover clip 10, illustrating the relationship between the front, face-cover-engaging portion of face cover clip 10 and the back, channel-engaging portion of face cover clip 10. It can be seen that a boss 16, generally circular in cross section, connects base 14 and legs 11a&b, such that base 14 stands off a certain distance from legs 11a&b. Additionally, entry bevels 17a&b are located at the face-cover-engaging ends of legs 11a&b to facilitate the passage of rib 12 on face cover 13 between legs 11a&b (rib 12 and face cover 13 are shown in FIGS. 11 & 12).

Figure 3:
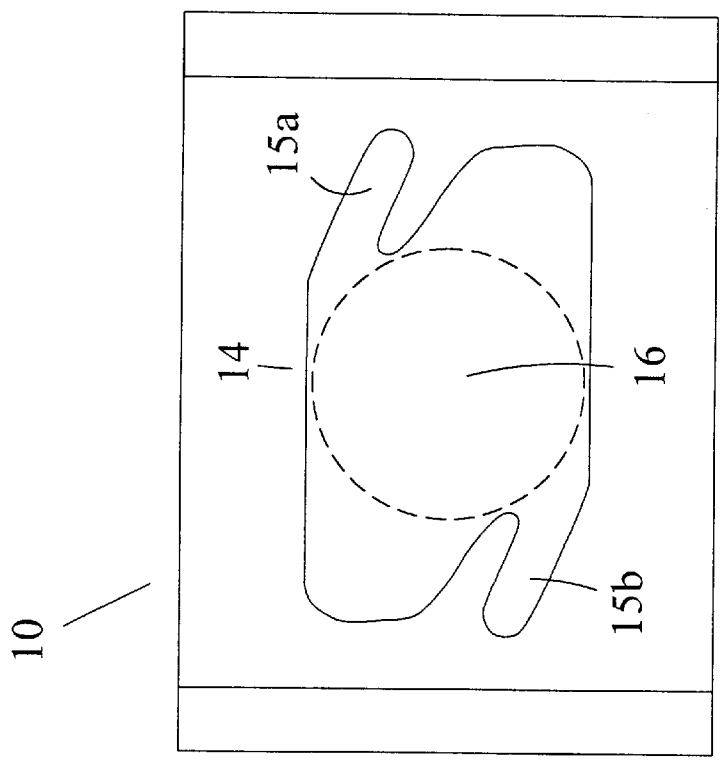
FIG. 3 is an end view of the face cover clip, viewed from the back (base) portion of the clip.

FIG. 3 is an end view of face cover clip 10, viewed from the base 14 (back) portion thereof, and further illustrates the generally rectangular nature of base 14 and the two diagonally-opposite fins 15a&b.

Figure 4:
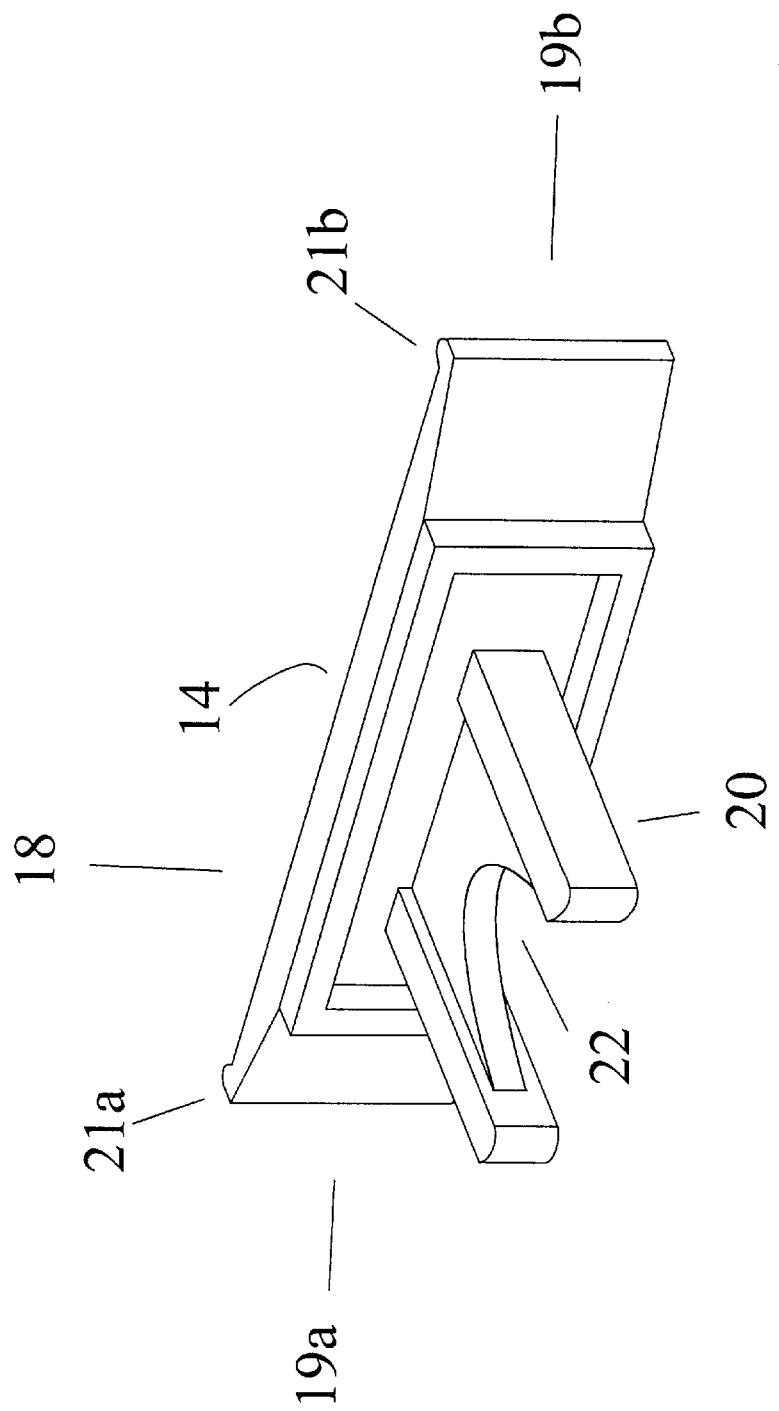
FIG. 4 is a perspective view of the glazing retainer clip, showing the front turning grip and the outwardly-projecting retaining arms.
Figure 5:
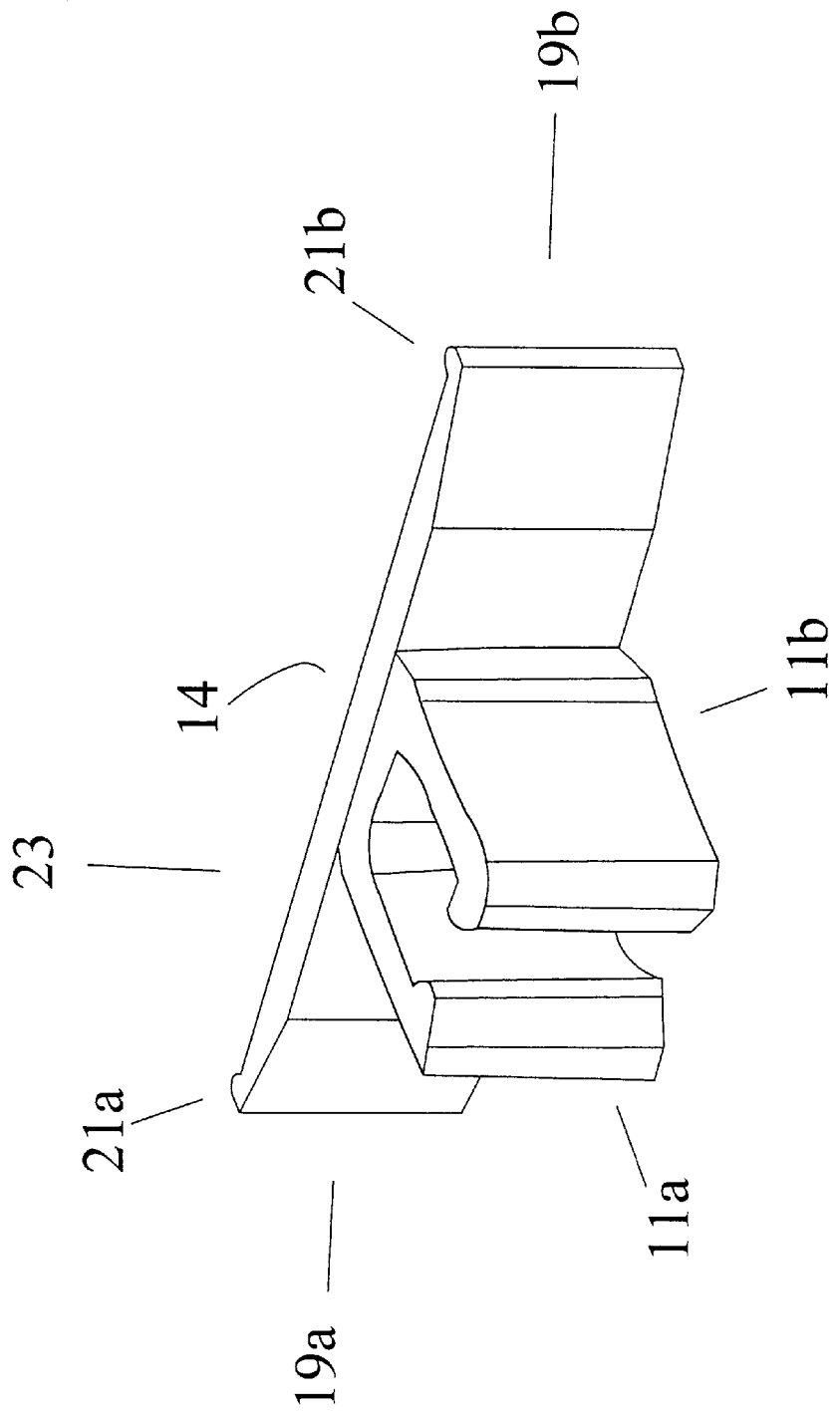
FIG. 5 is a perspective view of the combination clip, showing the facecover-engaging legs and the outwardly-projecting retaining arms.

FIGS. 4 and 5 illustrate additional glazing clip embodiments. FIG. 4 is a perspective view of a glazing retainer clip 18, adapted to secure glazing panels to a frame member or mullion. Glazing retainer clip 18 comprises a channel-engaging base 14 (hidden in FIG. 4), two outwardly-projecting retainer arms 19a&b, and a front turning grip 20. Projections 21a&b are located on the outer ends of retainer arms 19a&b respectively, said projections 21a&b extending from top to bottom of retainer arms 19a&b on the base-proximate (back) side of retainer arms 19a&b . A semi-circular indent 22 is located on the front portion of turning grip 20. Said indent 22 serves to prevent interference between the front of glazing retainer clip 18 and rib 12 on face cover 13, when glazing retainer clip 18 is installed on a frame member or mullion—i.e., it allows face cover 13 to be secured in place over the face of a frame member, as shown in FIG. 12, without having to first remove glazing retainer clip 18. Base 14 of glazing retainer clip 18 is identical in structure and functionality to base 14 of face cover clip 10.

FIG. 5 illustrates another embodiment of the invention, a combination clip 23. Combination clip 23 is comprised of a channel-engaging base 14 (hidden in FIG. 5), and two outwardly-projecting retainer arms 19a&b having projections 21a&b located thereon. The front face of combination clip 23 also comprises, instead of the indented turning grip 20 shown in the FIG. 4 embodiment, two face-cover-engaging legs 11a&b. Base 14 of combination clip 23 is identical in structure and functionality to base 14 of face cover clip 10 and glazing retainer clip 18. Thus it can be seen that combination clip 23 exhibits the front face-cover-engaging structure of face cover clip 10, the glazing retaining structure of glazing retainer clip 18, and the channel-engaging structure of both face cover clip 10 and glazing retainer clip 18.

Figure 6:
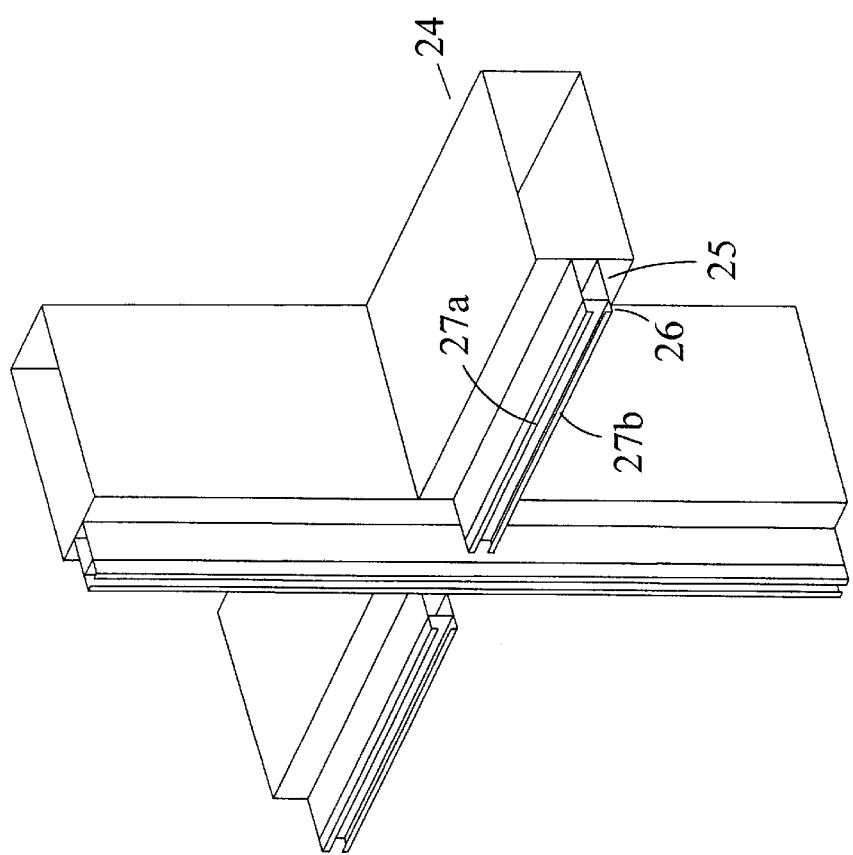
FIG. 6 is a perspective view of the frame members which form the supporting structure of the glazing panel wall.
Figure 7:
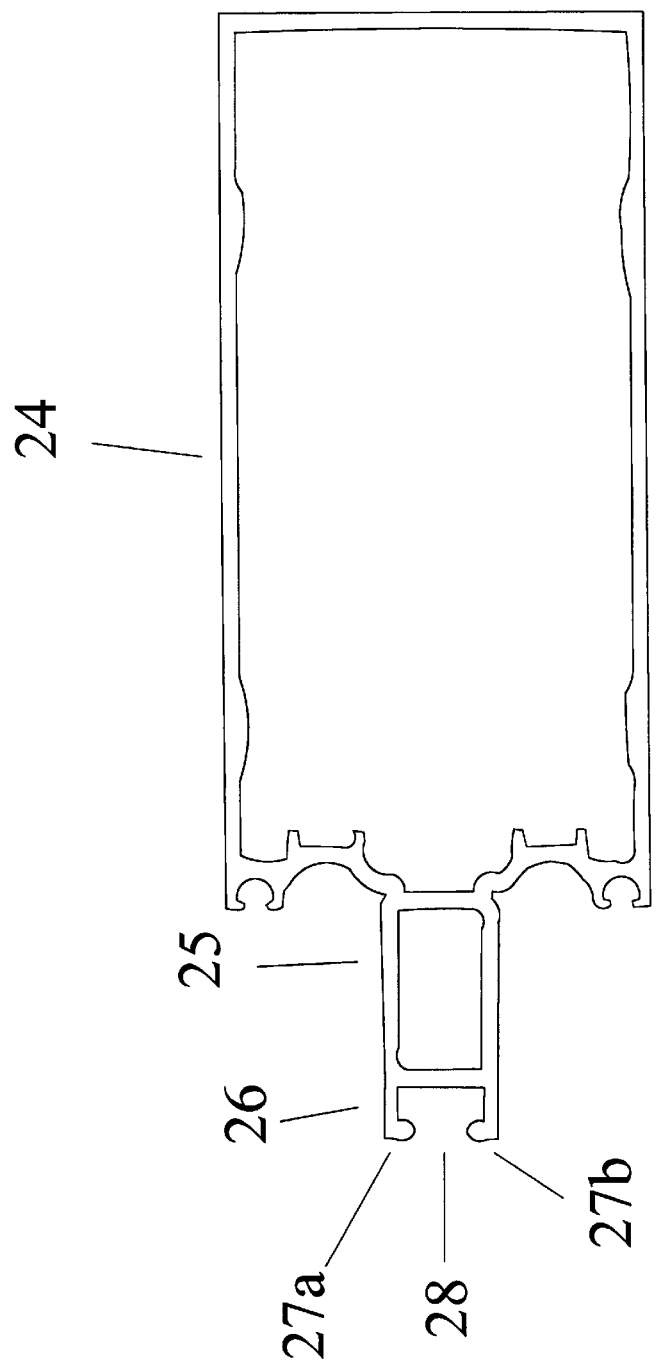
FIG. 7 is a cross-sectional view which further illustrates frame member 24, shelf 25, and channel 26.

Turning now to the remainder of the glazing panel wall system and the manner in which the glazing clips are used therein; FIG. 6 illustrates the plurality of frame members 24 which form the supporting structure of the glazing panel wall. Frame member 24 is elongated and generally rectangular in cross-section, and has a projecting shelf 25 located thereon. Shelf 25 is also generally rectangular in cross-section and extends along the lengthwise dimension of frame member 24. A channel 26 is located on the non-frame-member-proximate side of shelf 25, and extends along the lengthwise dimension thereof. Channel 26 is further defined by two flanges 27a&b which partially bound its non-shelf-proximate side, said flanges 27a&b forming a slotted opening 28 suitably sized to admit the narrower (width) dimension of base 14. FIG. 7 provides a cross-sectional view which further illustrates frame member 24, shelf 25, and channel 26. In addition, it can be appreciated that one frame member 24 may be attached to another, in the manner shown in FIG. 6, by any suitable mechanical, adhesive, or other means known to those of ordinary skill in the art.

Figure 8:
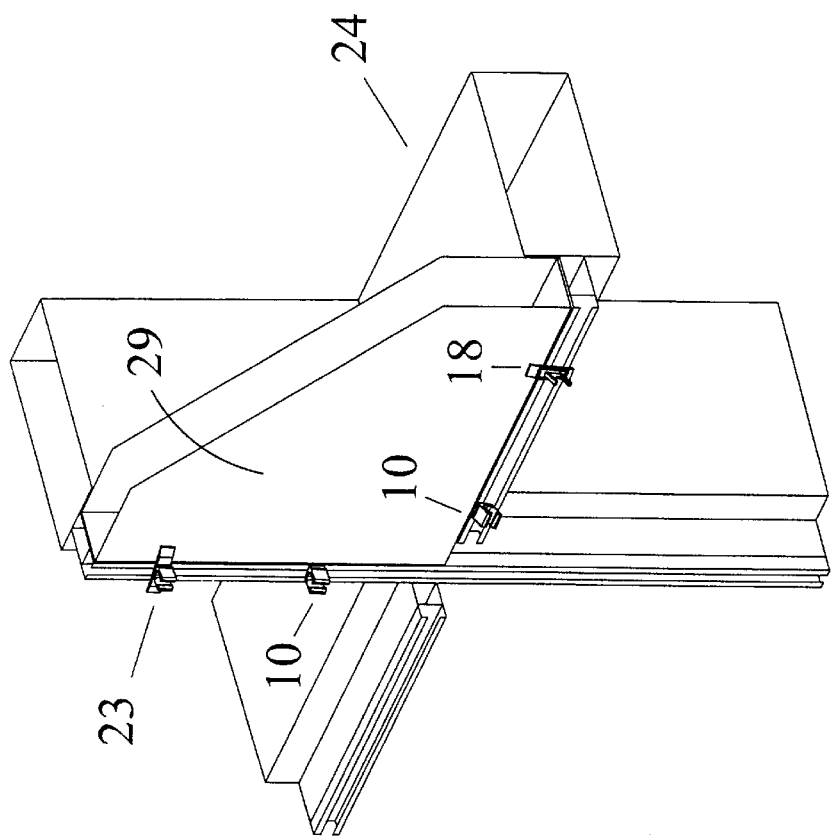
FIG. 8 illustrates the frame structure of FIG. 6, with a glazing panel in place on the framework and various glazing clips locked within the channels.
Figure 9:
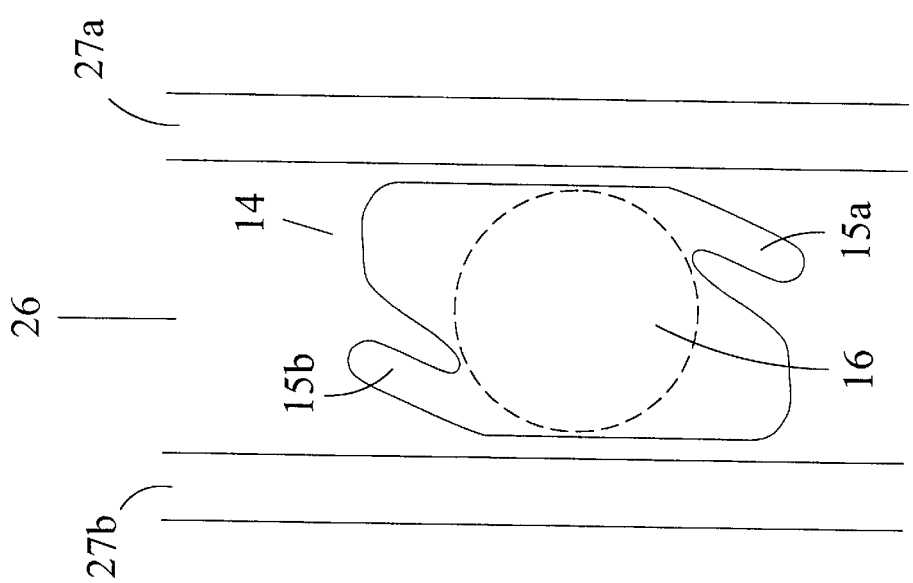
FIG. 9 is an end view of the base, viewed from the back of the frame channel, illustrating the rectangular nature and diagonally-opposed fins of the base.
Figure 10:
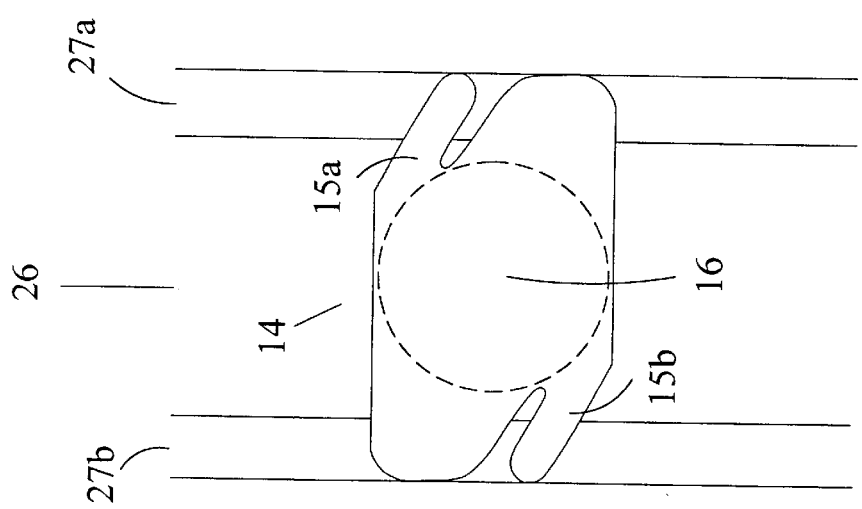
FIG. 10 is another end view of the base, also viewed from the back of the frame channel, wherein the base is locked within the channel and the fins are depressed from their original to their locked positions.

FIG. 8 illustrates the frame structure of FIG. 6, but with a glazing panel 29 fitted into place, and with two face cover clips 10, a glazing retainer clip 18, and a combination clip 23 locked into place within channel 26. FIGS. 9 and 10 are end views of base 14, viewed from the back (the frame-member-proximate side) of channel 26, and they illustrate the manner in which each clip is inserted into channel 26 and locked into place. As shown in FIG. 9, flanges 27a&b are spaced suitably apart so as to admit the narrower (width) dimension of base 14. Once base 14 is inside channel 26, base 14 is rotated counter-clockwise (the rotational direction is counter-clockwise when viewed from the back of the channel, as in FIGS. 9 and 10; and clockwise when viewed from the front of the channel, as in FIGS. 6 and 8). As base 14 continues to rotate, fins 15a&b come into contact with the side walls of channel 26 and are depressed inwardly. As shown in FIG. 10, the rotation of base 14 ceases when the generally rectangular ends of base 14 seat against the side walls of channel 26. Base 14, and thus the appropriate glazing clip of which base 14 is a part, is firmly held in place by the pressure of fins 15a&b against the side walls of channel 26.

FIG. 11 is an end view of face cover 13, which illustrates its structure in more detail. Face cover 13 is an elongated flat strip having two upstanding sides which, when face cover 13 is in the installed position, set face cover 13 off from frame member 24 and the surface of glazing panel 29. Face cover 13 also has a rib 12 disposed down the center of its lengthwise dimension, said rib 12 having a wedge-like leading edge suitable for engagement with legs 11a&b on face cover clip 10 and combination clip 23.

FIG. 12 illustrates the glazing panel wall, with one face cover 13 in place over the horizontal frame member 24, face cover clip 10, and glazing retainer clip 18. The other face cover 13 shown in FIG. 12 is in a position wherein it is about to be installed over the vertical frame member 24, face cover clip 10, and combination clip 23. It should be understood that the glazing panel wall of FIG. 12 would be completed by fitting additional glazing panels 29 into the other three quadrants of the framework, securing those glazing panels 29 to the framework by means of additional glazing retainer clips 18 and/or combination clips 23, and fitting additional face covers 13 over additional face cover clips 10.

The following provides a review of the process used in constructing the glazed panel wall of the invention:

First, frame members 24 are attached together to establish the framework of the wall. Second, glazing panels 29 are fitted into place on the framework, said glazing panels 29 being bounded by shelves 25 and by frame members 24. After glazing panels 29 are fitted into place, they are secured by glazing retainer clips 18 and/or combination clips 23 which are placed and locked into channel 26 around the perimeter of each glazing panel 29. Third, face cover clips 10 are placed and locked into channel 26 around the perimeter of each glazing panel 29, and face covers 13 are installed on the front faces of frame members 24 directly over glazing retainer clips 18 and/or combination clips 23. Neither glazing retainer clips 18 nor combination clips 23 need be removed prior to the installation of face covers 13. Once the glazing panel wall is complete, or indeed at any time after glazing panels 29 have been secured in place by glazing retainers 18 and/or combination clips 23, sealant or structural adhesive may be applied to the inside of the framework, for example at the junctions of glazing panel 29 and frame members 24.

It should also be noted that although face cover clip 10, glazing retainer clip 18, combination clip 23, and the channel-containing frame member 14 can be constructed of many materials, preferably said clips are constructed of plastic and said frame member is constructed of aluminum. The use of these two materials imparts advantageous thermal characteristics, and thermal stability, to the glazing panel wall system. Specifically, the clips will remain securely engaged within the channel in the frame member throughout freeze/thaw cycles or other conditions of varying temperature. Thus, the integrity of the glazing panel wall will not be compromised in a varying-temperature environment, for example when the glazing panel wall is used in an outside storefront application.

Conclusions, Ramifications, and Scope

Thus the reader will see that this invention provides a very convenient, timesaving, and effective way of constructing a glazing panel wall.

Figure 13:
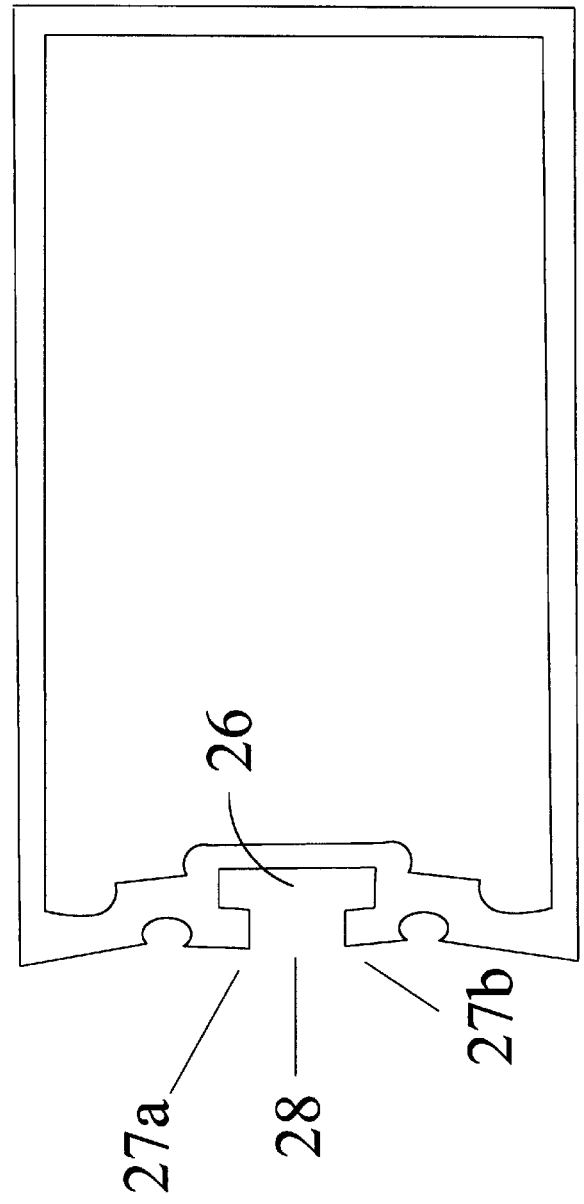
FIG. 13 is a top view of an SSG-type frame member.

While the above descriptions contain many specificities, these shall not be construed as limitations on the scope of the invention, but rather as exemplifications of embodiments thereof. Many other variations are possible. Examples of just a few of the possible variations follow:

The glazing panel wall system of the invention can also be used with a structural-silicone-glazing (SSG) type of vertical mullion, illustrated in FIG. 13, wherein the vertical sides of the glazing panels are secured with structural sealant rather than with glazing retainer and/or combination clips. The structural sealant is applied both to the back side of the glazing panels (at the juncture of the glazing panels and the SSG mullion), and also to the gap between the front of the glazing panels. Since an SSG system does not employ face covers over the vertical seams between glazing panels, no face cover clips are needed.

Rather than having a projecting shelf as in the standard vertical mullions shown in the drawings, an SSG mullion has a clip-engaging channel set within an otherwise flush front face. Thus, when the glazing panels are fitted into the framework of the wall, the vertical SSG mullion does not protrude between them, but rather lies recessed behind the glazing panels. Temporary glazing retainers (not shown) are used to temporarily retain the vertical sides of the glazing panels until the structural sealant is applied and has cured, and then these temporary glazing retainers are removed.

The temporary glazing retainers used in an SSG system of the invention are similar to the glazing retainer clips which have been shown, in that they have some form of front turning means such as a protruding tab, at least one retaining arm, and a channel-engaging base having at least one fin. However, the boss connecting the base to the rest of the clip is longer, which allows the clip to reach into the recess between the glazing panels and engage the channel in the SSG mullion.

Examples of Additional Variations Follow

The base can have one channel-contacting fin, instead of two as in the main embodiment. The fin can be of different length, width, or shape.

The glazing retainer clip and combination clip can have only one retaining arm, instead of two. This would of course be useful for retaining those sides of the glazing panels which are at the borders of the wall—i.e., those sides not having an immediately adjacent glazing panel. The retaining arm can also be of a different shape—circular, semi-circular, or triangular being just a few examples. In addition, the projections on the ends of the retaining arms can be eliminated.

The rotational direction of the clips, to lock them within the channel, can be made opposite—that is, counterclockwise when viewed from the front of the clip, and clockwise when viewed from the back of the clip—simply by moving the fins to the other two corners of the rectangular base.

The turning means of the glazing retainer clip can be of a different nature than the indented turning grip shown in the drawings—as just one example, it can be comprised of a slot or other recess formed into the body of the clip, suitable for turning with a screwdriver, knife point, or similar instrument. The shape of the frame member can be different—all that is required is that the frame member have a recess adapted for containing a glazing panel, and a channel which can be engaged by the glazing retainer clips and/or combination clips in order to hold the glazing panel in place.

The steps in the wall construction process can be done in a different sequence. As just one example, the face cover clips can be placed and locked in the channel at any time during the process—so long as they are installed before the face covers need to be installed, of course.

The fin structure of the clip base can be used in channel-engaging clips intended for many different purposes, and not just the glazing panel wall system shown in the embodiments herein. Said another way, the basic locking fin concept can be used anywhere a clip or other object is desired to engage a channel securely and conveniently.

Accordingly, the scope of the invention should be determined not by the embodiments illustrated, but by the appended claims and their legal equivalents.

What is claimed is:

1. A glazing clip, comprising:
   a) a first end, and
   b) a second end opposite said first end, said second end with channel-engaging means for fastening said glazing clip to a channel, said channel-engaging means comprising a projecting cam element with at least one fin on the outer side surface thereof,
   whereby said glazing clip can be inserted into said channel and then rotated to secure said glazing clip to said channel.

2. The glazing clip of claim 1, wherein said projecting cam element is of a substantially rectangular shape, having two fins located at two diagonally-opposite corners thereof.

3. The glazing clip of claim 1, wherein said first end has means for engaging a cover for said channel.

4. The glazing clip of claim 3, wherein said cover-engaging means comprise two spaced apart legs, each said leg having an end attached to said glazing clip and a free end, and each said leg having a catch on said free end suitable for engaging said cover.

5. The glazing clip of claim 1, wherein said glazing clip also comprises means for securing a glazing panel to a frame member associated with said channel.

6. The glazing clip of claim 5, wherein said means for securing said glazing panel to said frame member comprise at least one substantially flat planar element located between said first and second ends of, and extending outwardly from, said glazing clip.

7. The glazing clip of claim 5, wherein said means for securing said glazing panel to said frame member comprise two substantially flat planar elements located between said first and second ends of, and extending outwardly in opposing directions from, said glazing clip.

8. The glazing clip of claim 1, wherein said glazing clip also comprises means, located on said first end of said glazing clip, for rotating said glazing clip within said channel.

9. The glazing clip of claim 8, wherein said means for rotating comprise a turning grip having a semi-circular indent located on the front surface thereof.

10. The glazing clip of claim 1, wherein said glazing clip also comprises means for securing a glazing panel to a frame member associated with said channel, and means for engaging a cover for said channel.

11. The glazing clip of claim 10, wherein said cover-engaging means comprise two spaced apart legs, each said leg having an end attached to said glazing clip and a free end, and each said leg having a catch on said free end suitable for engaging said cover.

12. The glazing clip of claim 10, wherein said means for securing said glazing panel to said frame member comprise at least one substantially flat planar element located between said first and second ends of, and extending outwardly from, said glazing clip.

13. The glazing clip of claim 10, wherein said means for securing said glazing panel to said frame member comprise two substantially flat planar elements located between said first and second ends of, and extending outwardly in opposing directions from, said glazing clip.

14. A glazing panel wall system, comprising:
   a) a frame member having a channel located thereon and having a glazing recess formed on one side thereof,
   b) a glazing panel adapted to fit into said glazing recess,
   c) a glazing clip comprising:
      i) a first end, and
      ii) a second end opposite said first end, said second end with channel-engaging means for fastening said glazing clip to said channel, said channel-engaging means comprising a projecting cam element with at least one fin on its outer side surface, and
      iii) means for securing said glazing panel to said frame member.

15. The glazing panel wall system of claim 14, wherein said projecting cam element is of a substantially rectangular shape, having two fins located at two diagonally-opposite corners thereof.

16. The glazing panel wall system of claim 14, wherein said glazing clip also comprises means, located on said first end of said glazing clip, for rotating said glazing clip within said channel.

17. The glazing panel wall system of claim 16, wherein said means for rotating comprise a turning grip having a semi-circular indent located on the front surface thereof.

18. The glazing panel wall system of claim 14, wherein said means for securing said glazing panel to said frame member comprise at least one substantially flat planar element located between said first and second ends of, and extending outwardly from, said glazing clip.

19. The glazing panel wall system of claim 18, wherein said means for securing said glazing panel to said frame member comprise two substantially flat planar elements located between said first and second ends of, and extending outwardly in opposing directions from, said glazing clip.

20. The glazing panel wall system of claim 14, wherein said glazing panel wall system also comprises a cover and means for attaching said cover to said channel directly over said glazing clip.

21. The glazing panel wall system of claim 14, wherein said glazing clip is constructed of plastic and said frame member is constructed of aluminum.

22. A glazing clip, comprising:
   a) a first end with a turning grip located thereon, said turning grip having an indented front surface, and
   b) a second end opposite said first end, said second end with channel-engaging means for fastening said glazing clip to a channel, and
   c) means for securing a glazing panel to a frame member associated with said channel, said means being integrally formed of one piece with said channel-engaging means,
   whereby said glazing clip can be inserted into and secured within said channel 23. The glazing clip of claim 22, wherein said means for securing said glazing panel to said frame member comprise at least one substantially flat planar element located between said first and second ends of, and extending outwardly from, said glazing clip.

24. The glazing clip of claim 22, wherein said means for securing said glazing panel to said frame member comprise two substantially flat planar elements located between said first and second ends of, and extending outwardly in opposing directions from, said glazing clip.

25. A glazing clip, comprising:
   a) a first end with means for engaging a cover for a channel, and
   b) a second end opposite said first end, said second end with channel-engaging means for fastening said glazing clip to said channel, and
   c) means for securing a glazing panel to a frame member associated with said channel, said means being integrally formed of one piece with said channel-engaging means,
   whereby said glazing clip can be inserted into and secured within said channel.

26. The glazing clip of claim 25, wherein said cover-engaging means comprise two spaced apart legs, each said leg having an end attached to said glazing clip and a free end, and each said leg having a catch on said free end suitable for engaging said cover.

27. The glazing clip of claim 25, wherein said means for securing said glazing panel to said frame member comprise at least one substantially flat planar element located between said first and second ends of, and extending outwardly from, said glazing clip.

28. The glazing clip of claim 25, wherein said means for securing said glazing panel to said frame member comprise two substantially flat planar elements located between said first and second ends of, and extending outwardly in opposing directions from, said glazing clip.

* * * * *